(12) United States Patent
Qiu (10) Patent No.: US 11,109,457 B2
(45) Date of Patent: *Aug. 31, 2021

(54) ARBITRARY-RATIO ANALOG CURRENT DIVISION CIRCUIT

(71) Applicant: Lumileds LLC, San Jose, CA (US)

(72) Inventor: Yifeng Qiu, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,874

(22) Filed: Feb. 10, 2020

(65) Prior Publication Data

US 2020/0196411 A1 Jun. 18, 2020

Related U.S. Application Data

(63) Continuation of application No. 16/145,053, filed on Sep. 27, 2018, now Pat. No. 10,588,194.

(51) Int. Cl.
*H05B 45/24* (2020.01)
*H05B 45/37* (2020.01)
*H05B 45/395* (2020.01)

(52) U.S. Cl.
CPC ............. *H05B 45/24* (2020.01); *H05B 45/37* (2020.01); *H05B 45/395* (2020.01)

(58) Field of Classification Search
CPC ...... H05B 45/24; H05B 45/37; H05B 45/395; H05B 45/46; Y02B 20/30
See application file for complete search history.

(56) References Cited

U.S. PATENT DOCUMENTS 10,588,194 B1 3/2020 Qiu
2009/0187925 A1* 7/2009 Hu .................... H05B 45/3725
719/327

(Continued)

FOREIGN PATENT DOCUMENTS

EP 3240368 A1 11/2017
WO WO-2017114146 A1 7/2017
WO WO-2020/069328 A1 4/2020

OTHER PUBLICATIONS

"European Application Serial No. 18209861.6, European Search Report dated Apr. 11, 2019", 9 pgs.

(Continued)

*Primary Examiner* — Raymond R Chai
(74) *Attorney, Agent, or Firm* — Schwegman Lundberg & Woessner, P.A.

(57) ABSTRACT

In various embodiments, a device and method of dividing current among LED arrays is described. Each array has a sense resistor to sense a voltage of a current channel associated with the array. An analog or digital computational circuit with an op-amp and parallel RC circuit or microprocessor compares the voltages of the sense resistors and controls switches of the arrays accordingly. The analog circuit charges or discharges the capacitor to alter the output voltage used to control the switches. The microprocessor determines a ratio of the sensed voltages to generate the output voltage, maps a control signal to the ratio, directs input current to one or the other channel dependent on the control signal voltage and otherwise scales the input current between the channels. Other apparatuses, devices, and methods are described as well.

18 Claims, 9 Drawing Sheets

(56) References Cited

U.S. PATENT DOCUMENTS

| | | |
|---|---|---|
| 2013/0015774 A1 | 1/2013 | Briggs |
| 2013/0106292 A1 | 5/2013 | Koo et al. |
| 2014/0247590 A1 | 9/2014 | Wilcox et al. |
| 2015/0076999 A1* | 3/2015 | Malinin ................ H05B 45/24 315/186 |
| 2017/0339756 A1 | 11/2017 | Ahn et al. |
| 2017/0374712 A1* | 12/2017 | Qu ........................... B60Q 1/44 |
| 2018/0027626 A1* | 1/2018 | Wang ..................... H05B 45/48 315/186 |
| 2018/0092172 A1* | 3/2018 | Yoo ..................... B60Q 1/2696 |
| 2019/0045595 A1* | 2/2019 | Johnsen ................ H05B 45/46 |
| 2019/0254130 A1* | 8/2019 | Chen ..................... H05B 45/46 |
| 2020/0107418 A1 | 4/2020 | Qiu |

OTHER PUBLICATIONS

"U.S. Appl. No. 16/145,053, Non Final Office Action dated May 6, 2019".

"U.S. Appl. No. 16/145,053, Notice of Allowance dated Oct. 29, 2019", 10 pgs.

"U.S. Appl. No. 16/145,053, Response filed Oct. 4, 2019 to Non-Final Office Action dated May 6, 2019", 10 pgs.

"International Application Serial No. PCT/US2019/053479, International Search Report dated Feb. 4, 2020", 4 pgs.

"International Application Serial No. PCT/US2019/053479, Written Opinion dated Feb. 4, 2020", 7 pgs.

U.S. Appl. No. 16/145,053, filed Sep. 27, 2018, Arbitrary-Ration Analog Current Division Circuit.

\* cited by examiner

ARBITRARY-RATIO ANALOG CURRENT DIVISION CIRCUIT

PRIORITY

This application claims the benefit of priority to U.S. patent application Ser. No. 16/145,053, filed Sep. 27, 2018, which is incorporated herein by reference in its entirety.

FIELD OF INVENTION

The present invention relates to a division circuit, and more particularly to an analog current division circuit.

BACKGROUND

A light emitting device (LED) or Electroluminescent Device (ELD) circuit capable of dividing a current into two or more channels of equal or unequal proportions provides certain advantages. For example, multiple LED channels of different colors may share a single channel LED driver in a correlated color temperature (CCT) tuning system without the need for multi-channel DC/DC converters.

In general, there are two approaches to current division. The first method is the time-division method. In the time division method, each channel conducts the full amplitude of the input current within the allocated time slot. The second method is dividing the current by amplitude. The second method operates in the analog domain and creates multiple currents of small amplitudes, the sum of which is equal to that of the input current. Dividing a current by amplitude provides certain advantages, including but not limited to, avoiding switching noise and maximizing the utilization of LEDs, thereby increasing the efficacy.

In general, analog current division in LEDs achieved through parallel LED arrays. Resistors are connected in series on each array in order to linearize the forward voltage. Parallel LED arrays are best driven with equal current so as to avoid current hogging. Therefore, the current must be divided into equal proportions and the system can only deal with a very limited amount of mismatch between the parallel LED arrays.

It would be beneficial to provide an LED circuit capable of dividing a current into two or more channels via parallel LED arrays in which the current is divided into arbitrary ratios and can deal with a large mismatch between the parallel LED arrays.

SUMMARY

Circuits and methods for dividing a single current source into two or more current channels are provided. The circuits and method of the present disclosure allow a single current source to be divided into arbitrary ratios and can tolerate a large mismatch between the current channels.

DETAILED DESCRIPTION OF THE PREFERRED EMBODIMENTS

In the following description, numerous specific details are set forth, such as particular structures, components, materials, dimensions, processing steps, and techniques, in order to provide a thorough understanding of the present embodiments. However, it will be appreciated by one of ordinary skill of the art that the embodiments may be practiced without these specific details. In other instances, well-known structures or processing steps have not been described in detail in order to avoid obscuring the embodiments. It will be understood that when an element such as a layer, region, or substrate is referred to as being "on" or "over" another element, it can be directly on the other element or intervening elements may also be present. In contrast, when an element is referred to as being "directly on" or "directly" over another element, there are no intervening elements present. It will also be understood that when an element is referred to as being "beneath," "below," or "under" another element, it can be directly beneath or under the other element, or intervening elements may be present. In contrast, when an element is referred to as being "directly beneath" or "directly under" another element, there are no intervening elements present.

In the interest of not obscuring the presentation of embodiments in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments described herein.

The use of LEDs is described herein. However, one or more types of semiconductor-based light-emitting devices or optical power-emitting-devices may be used in the embodiments described herein. These devices may include resonant-cavity light emitting diodes, vertical-cavity laser diodes, edge-emitting lasers, or the like. Such devices may be used in a wide variety of applications, including as light sources (e.g., flash lights and camera flashes) for hand-held battery-powered devices such as cameras and cellular phones, for automotive lighting, heads-up display (HUD) lighting, horticultural lighting, street lighting, a torch for video, general illumination (e.g., home, shop, office and studio lighting, theater/stage lighting, and architectural lighting), augmented reality (AR) lighting, virtual reality (VR) lighting, as back lights for displays, and IR spectroscopy.

In some embodiments, a single LED may provide light that is less bright than an incandescent light source. In such embodiments, certain applications may use multi junction devices or arrays of LEDs (such as monolithic LED arrays, micro LED arrays, etc.) when enhanced brightness is desired or required.

The color appearance of an object is determined, in part, by the spectral power density (SPD) of light illuminating the object. For humans viewing an object, the SPD is the relative intensity for various wavelengths within the visible light spectrum. However, other factors can also affect color appearance. Both a correlated color temperature (CCT) of the light (e.g. LED), and a distance of the temperature of the LED on the CCT from a black-body line (BBL, also known as a black-body locus or a Planckian locus), can affect a human's perception of an object. In particular there is a large market demand for LED lighting solutions, such as in retail and hospitality lighting applications, where it is desirable to control both a color temperature and a brightness level of the LEDs.

Figure 1:
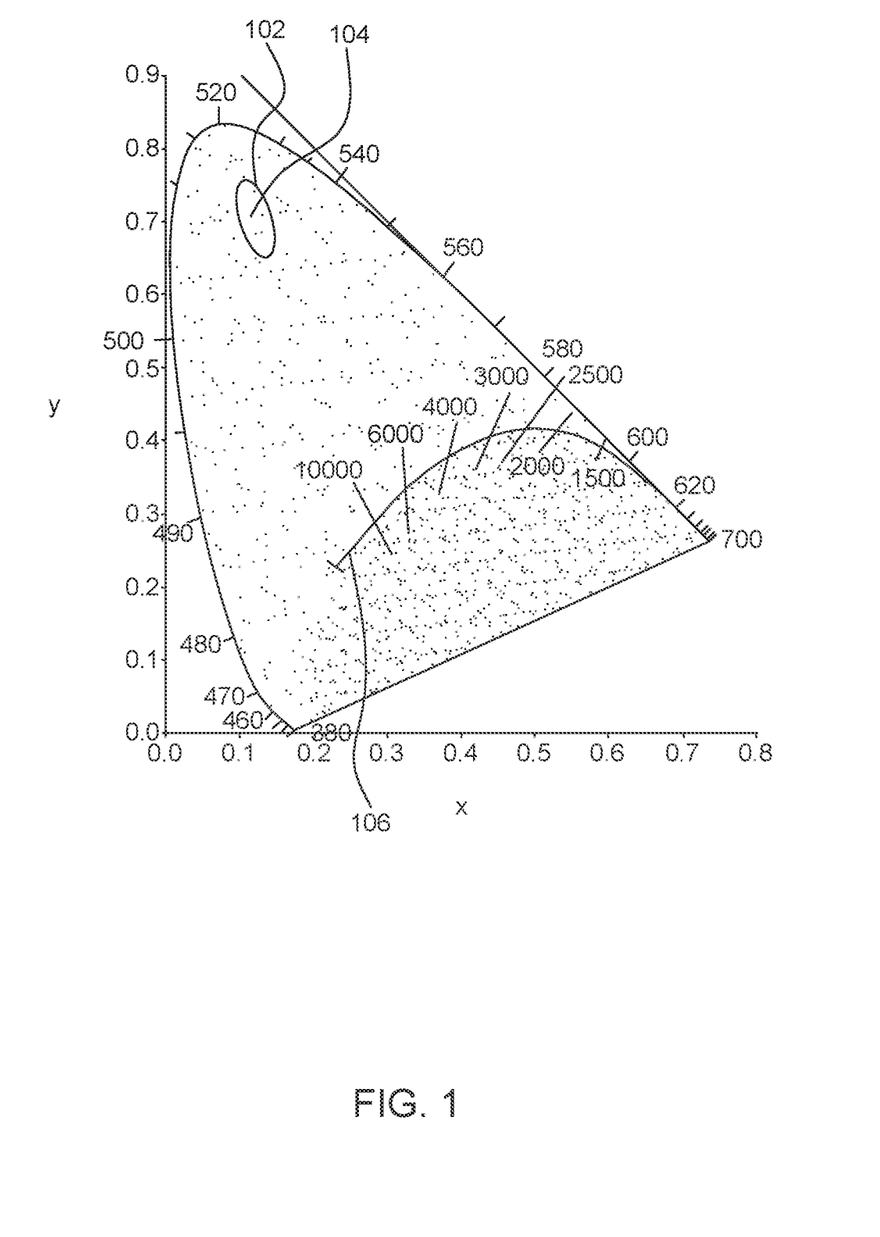
FIG. 1 is a chromaticity diagram representing a color space.

Referring to FIG. 1, a chromaticity diagram representing a color space is shown. A color space is a three-dimensional space; that is, a color is specified by a set of three numbers that specify the color and brightness of a particular homogeneous visual stimulus. The three numbers may be the International Commission on Illumination (CIE) coordinates X, Y, and Z, or other values such as hue, colorfulness, and luminance. Based on the fact that the human eye has three different types of color sensitive cones, the response of the eye is best described in terms of these three "tristimulus values."

A chromaticity diagram is a color projected into a two-dimensional space that ignores brightness. For example, the standard CIE XYZ color space projects directly to the corresponding chromaticity space specified by the two chromaticity coordinates known as x and y, as shown in FIG. 1.

Chromaticity is an objective specification of the quality of a color regardless of its luminance. Chromaticity consists of two independent parameters, often specified as hue and colorfulness, where the latter is alternatively called saturation, chroma, intensity, or excitation purity. The chromaticity diagram may include all the colors perceivable by the human eye. The chromaticity diagram may provide high precision because the parameters are based on the SPD of the light emitted from a colored object and are factored by sensitivity curves which have been measured for the human eye. Any color may be expressed precisely in terms of the two color coordinates x and y.

All colors within a certain region, known as a MacAdam ellipse (MAE) 102, may be indistinguishable to the average human eye from the color at the center 104 of the ellipse. The chromaticity diagram may have multiple MAEs. Standard Deviation Color Matching in LED lighting uses deviations relative to MAEs to describe color precision of a light source.

The chromaticity diagram includes the Planckian locus, or the BBL 106. The BBL 106 is the path or locus that the color of an incandescent black body would take in a particular chromaticity space as the blackbody temperature changes. It goes from deep red at low temperatures through orange, yellowish white, white, and finally bluish white at very high temperatures. Generally speaking, human eyes prefer white color points not too far away from the BBL 106.

In various environments where LEDs are used to illuminate objects, as well as for general lighting, it may be desirable to control aspects of the color temperature of the LEDs in addition to a relative brightness (e.g., luminous flux) of the lamps. Such environments may include, for example, retail locations as well as hospitality locations such as restaurants and the like. In addition to the CCT, another metric is the color-rendering index (CRI) of the light. The CRI is defined by the CIE and provides a quantitative measure of an ability of any light source (including LEDs) to accurately represent colors in various objects in comparison with an ideal, or natural-light source. The highest possible CRI value is 100. Another quantitative metric is $D_{uv}$. The $D_{uv}$ is a metric defined in, for example, CIE 1960, to represent the distance of a color point to the BBL 106. It is a positive value if the color point is above the BBL 106 and a negative value if the color point is below the BBL 106. Color points above the BBL 106 appear greenish in color and those below the BBL 106 appear pinkish in color.

As above, human eyes prefer white color points that are relatively close to the BBL 106. One method of creating white light using light emitting diodes (LEDs) may be to additively mix red, green and blue colored lights. However, this method may require precise calculation of mixing ratios so that the resulting color point is on or close to the BBL 106. Another method may be to mix two or more phosphor converted white LEDs of different correlated color temperatures (CCTs). This method is described in additional detail below.

To create a tunable white light engine, LEDs having two different CCTs on each end of a desired tuning range may be used. For example, a first LED may have a CCT of 2700K, which is a warm white, and a second LED may have a color temperature of 4000K, which is a neutral white. White colors having a temperature between 2700K and 4000K may be obtained by simply varying the mixing ratio of power provided to the first LED through a first channel of a driver and power provided to the second LED through a second channel of the driver.

Figure 2:
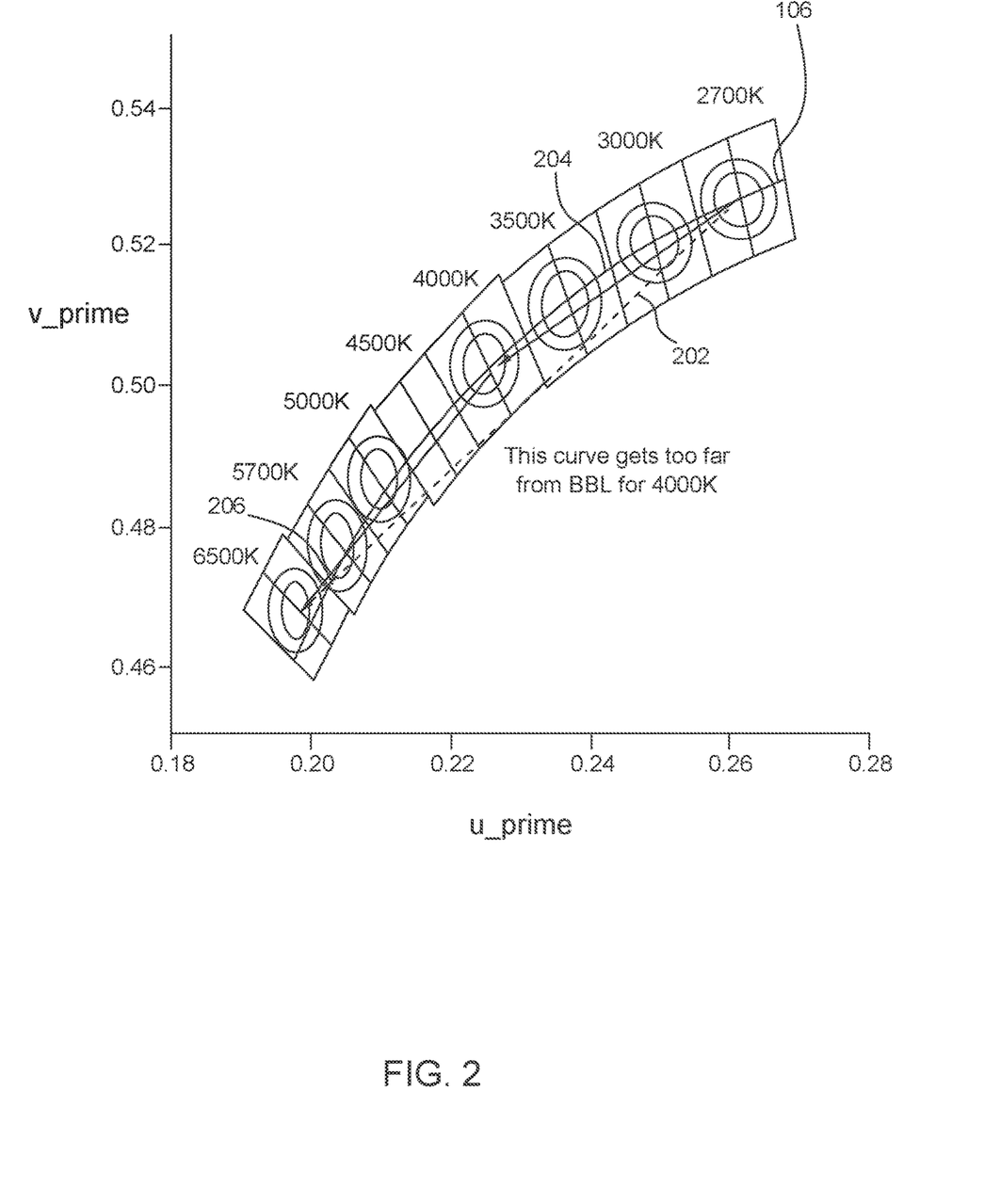
FIG. 2 is a diagram illustrating different correlated color temperatures (CCTs) and their relationship to a black body line (BBL) on the chromaticity diagram.

Referring now to FIG. 2, a diagram illustrating different CCTs and their relationship to the BBL 106 is shown. When plotted in the chromaticity diagram, the achievable color points of mixing two LEDs with different CCTs may form a first straight line 202. Assuming the color points of 2700K and 4000K are exactly on the BBL 106, the color points in between these two CCTs would be below the BBL 106. This may not be a problem, as the maximum distance of points on this line from the BBL 106 may be relatively small.

Dividing one current sink or current source into N channels essentially creates N current sinks or N current sources. According to Kirchhoff's current laws, the sum of all the currents flowing into one node must be zero. As such, at any node in an electrical circuit, the sum of currents flowing into that node is equal to the sum of currents flowing out of that node. Stated another way, the algebraic sum of currents in a network of conductors meeting at a point is zero. This principle may be stated as the following equation:

$$\Sigma_{k=1}^{n} I_k = 0 \qquad \text{Equation (1)}$$

However, in practice it is nearly impossible to create N regulated currents whose sum is precisely equal to the input current being divided. This is because, in general, the input current is not known.

Figure 3:
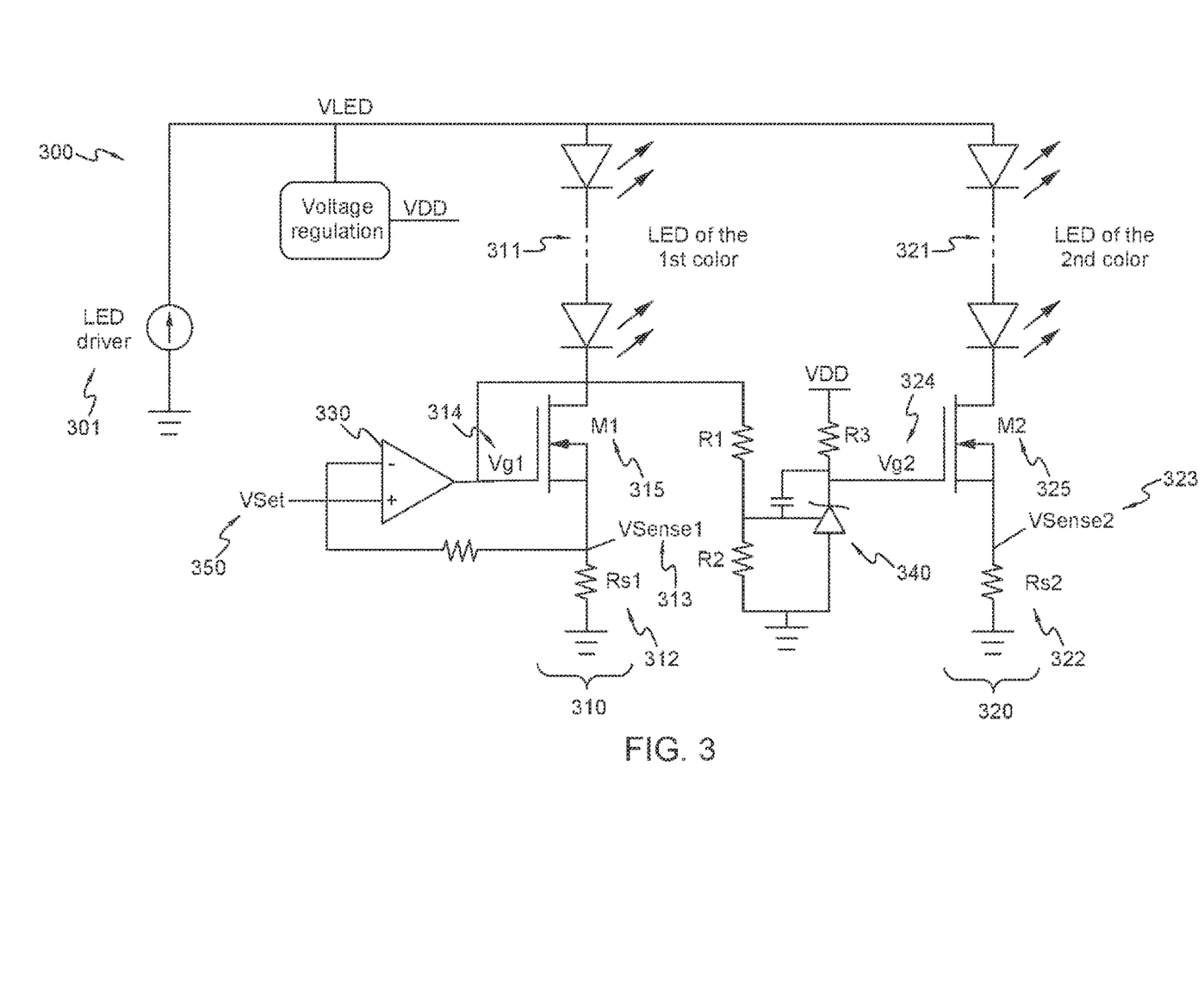
FIG. 3 is a circuit diagram of a current division circuit of the present disclosure.

Referring to FIG. 3, a circuit diagram of a current division circuit 300 is shown. The current division circuit 300 makes use of various analog techniques, such as voltage sensing, voltage control current source, and negative feedback.

As described in more detail below, the current division circuit of the present disclosure may enable dividing an input current into two or more current channels. The current division circuit of the present disclosure comprises at least one regulated current channel and the number of regulated current channels is one less than the total number of current channels. For example, if there is a total of three current channels, there can only be two regulated current channels.

In an embodiment, the current division circuit may be mounted on a converter printed circuit board (PCB) between an LED driver 301 and a LED board. The LED driver 301 may be a conventional LED driver known in the art. The current division circuit may allow the LED driver 301 to be used for applications requiring two or more LED arrays, or each of one or more LEDs. For example, the LED driver 301 of current division circuit 300 may be used to power a first LED array 311 and a second LED array 321.

In an embodiment, the LED driver 301 is used to power two LED arrays having different CCTs. In other embodiments, the two LED arrays may have different color ranges, infrared (IR) ranges, and ultraviolet (UV) ranges.

Each current channel of the current division circuit comprises a sense resistor. For example, in an embodiment with two current channels, the current division circuit comprises a first sense resistor ($R_{s1}$) 312 to sense a first sensed voltage of the first current channel 310 at $V_{sense1}$ 313 and a second sense resistor ($R_{s2}$) 322 to sense a second voltage of the second current channel 320 at $V_{sense2}$ 323. The voltage at $V_{sense1}$ 313 is representative of the current flowing through the first sense resistor ($R_{s1}$) 312 and the voltage at $V_{sense2}$ 323 is representative of the current flowing through the second sense resistor ($R_{s2}$) 322.

The current division circuit 300 of the present disclosure further comprises a computational device (not shown). The computational device is configured to compare the first sensed voltage ($V_{sense1}$) 313 and the second sensed voltage ($V_{sense2}$) 323 to determine a set voltage ($V_{set}$) 350. If the first sensed voltage ($V_{sense1}$) 313 is lower than the second sensed voltage ($V_{sense2}$) 323, the computational device is configured to increase $V_{set}$. If the first sensed voltage ($V_{sense1}$) 313 is greater than the second sensed voltage ($V_{sense2}$) 323, the computational device is configured to decrease the set voltage ($V_{set}$) 350.

The set voltage ($V_{set}$) 350 may be fed to a voltage controlled current source, which may be implemented with a first operational amplifier (opamp) 330. The first opamp 330 may provide a first gate voltage ($V_{g1}$) 314. The first gate voltage ($V_{g1}$) 314 may be input to a first transistor (M1) 315 that is used to provide a driving current for the first LED array 311. The first transistor (M1) 315 may be a conventional metal oxide semiconductor field effect transistor (MOSFET). The first transistor M1 may be an n-channel MOSFET. Note that while MOSFETs are referred to, one or more of the transistors described herein may be other types of FETs or bipolar junction transistors (BJTs). In some embodiments, other circuits may be used to provide the switching of one or more of the switches.

A second transistor (M2) 325 may control power to the second LED array 321. The second transistor (M2) 325 may be a conventional metal oxide semiconductor field effect transistor (MOSFET). The second transistor M2 may be an n-channel MOSFET. The second transistor (M2) 325 may only be switched on when the first circuit channel 310 is in regulation. A second gate voltage ($V_{g2}$) 324 may flow through the second transistor (M2) 325.

The second gate voltage ($V_{g2}$) 324 may be fed to a REF input of a shunt regulator 340. In an embodiment, the shunt regulator 340 has an internal reference voltage of 2.5V. When the voltage applied at the REF node is higher than 2.5V, the shunt regulator 340 may sink a large current. When the voltage applied at the REF node is lower than 2.5V, the first shunt regulator may sink a very small quiescent current.

The large sinking current may pull the gate voltage of the second transistor (M2) 325 down to a level below its threshold, which may switch off the second transistor (M2) 325. The shunt regulator 340 may not be able to pull their cathodes more than the forward voltage ($V_f$) of a diode below their REF nodes. Accordingly, the second transistor (M2) 325 may have a threshold voltage that is higher than 2.5V. Alternatively, a shunt regulator with a lower internal reference voltage, such as 1.24V, may be used.

Figure 4:
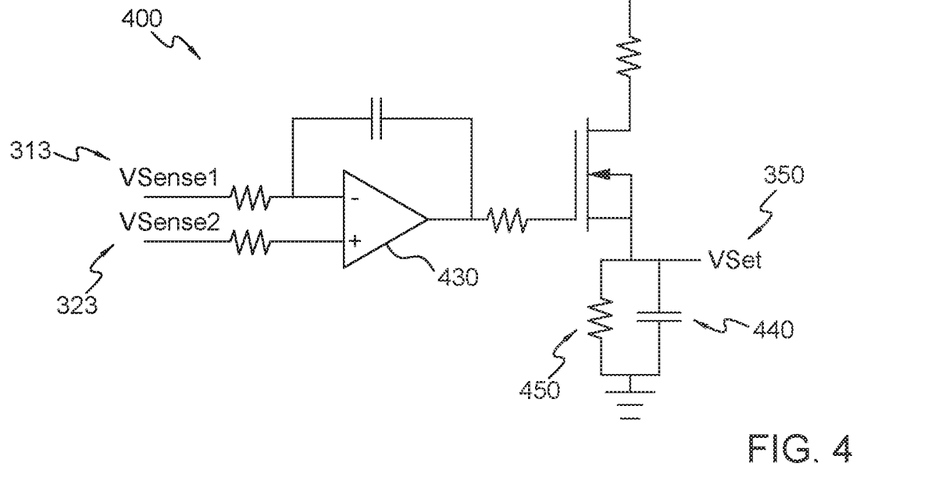
FIG. 4 is a circuit diagram of a computational circuit that may be used with the analog current division circuit of FIG. 3.

Referring to FIG. 4, the computational device may be a computational circuit 400. The computational circuit 400 may comprise a second opamp 430, a capacitor 440 between the location of the set voltage ($V_{set}$) 350 and the ground, and a resistor 450 in parallel to the capacitor 440. The first sensed voltage ($V_{sense1}$) 313 and the second sensed voltage ($V_{sense2}$) 323 are fed to the second opamp 430. The computational circuit 400 may be configured to compare the first sensed voltage ($V_{sense1}$) 313 to the second sensed voltage ($V_{sense2}$) 323 by subtracting the first sensed voltage ($V_{sense1}$) 313 from the second sensed voltage ($V_{sense2}$) 323.

When the second opamp 430 is in regulation, the computational circuit 400 may be configured to convert the difference of the first sensed voltage ($V_{sense1}$) 313 and the second sensed voltage ($V_{sense2}$) 323 into a charging current to charge the capacitor 440 to increase the set voltage ($V_{set}$) 350 when the first sensed voltage ($V_{sense1}$) 313 is less than the second sensed voltage ($V_{sense2}$) 323. The computational circuit 400 may be configured to convert the difference of the first sensed voltage ($V_{sense1}$) 313 and the second sensed voltage ($V_{sense2}$) 323 into a discharging current to discharge the capacitor 440 through the resistor 450 to decrease the set voltage ($V_{set}$) 350 when the first sensed voltage ($V_{sense1}$) 313 is greater than the second sensed voltage ($V_{sense2}$) 323.

Therefore, if the first sensed voltage ($V_{sense1}$) 313 is higher than the second sensed voltage ($V_{sense2}$) 323, the computational circuit 400 may decrease the set voltage ($V_{set}$) 350 which in turn decreases the first gate voltage ($V_{g1}$) 314 which supplies power to the first current channel 310. Stated another way, when the second opamp 430 is in regulation, the first sensed voltage ($V_{sense1}$) 313 is approximately equal to second sensed voltage ($V_{sense2}$) 323. Therefore during steady state, the ratio of the current of the first current channel 310 to the current of the second current channel 320 is equal to the value of the second sense resistor ($R_{s2}$) 322 to the value of the first sense resistor ($R_{s1}$) 312, and the following equations are satisfied:

$$I_{Rs1} = \frac{V_{set}}{R_{s1}}; \qquad \text{Equation (2)}$$

$$I_{Rs2} = \frac{V_{set}}{R_{s2}}. \qquad \text{Equation (3)}$$

Therefore, when the value of the first sense resistor ($R_{s1}$) 312 equals the value of the second sense resistor ($R_{s2}$) 322, the current flowing through the first resistor ($I_{Rs1}$) equals the current flowing through the second resistor ($I_{Rs2}$) and the current division circuit 300 divides the current into two equal parts, assuming the current drawn by the auxiliary circuits, such as supply voltage generation, is negligible.

It should be noted that the computational circuit 400 should be tested for closed-loop behavior and stability and adjusted accordingly.

It should further be noted that, as will be appreciated by one having ordinary skill in the art, the computational circuit 400 illustrated in FIG. 4 is one of many possible implementations.

As previously noted, the current division circuit 300 may be divided into three or more channels. For example, the first current channel 310 may be replicated so that there is a first current channel, a second current channel, and a third current channel. The first current channel and the second current channel would be regulated current channels, such as the first current channel 310 of the current division circuit 300 shown in FIG. 3. The third current channel would not be regulated and would resemble the second current channel 320 of the current division circuit 300 shown in FIG. 3.

It should also be noted that the computational circuit 400 illustrated in FIG. 4 may become complicated for current division circuits dividing one current source into three or more current channels. As such, the computation circuit illustrated in FIG. 4 may be replaced with a microcontroller.

Figure 5:
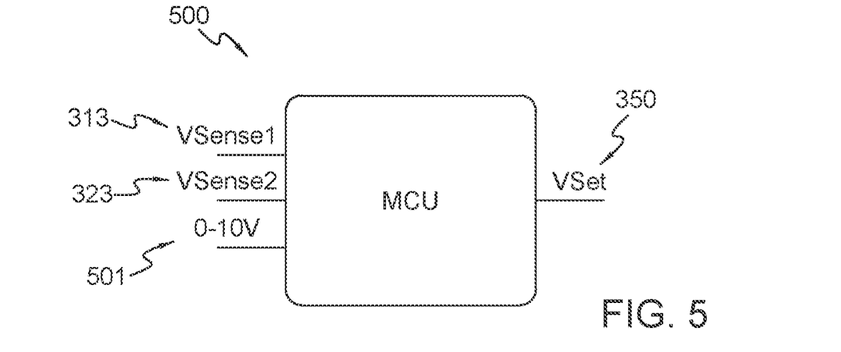
FIG. 5 is a microcontroller that may be used with the current division circuit of FIG. 3.

Referring to FIG. 5, in one embodiment, the computational device may be a microcontroller 500, which can handle complex signal processing with less PCB resources than analog circuits. The microcontroller 500 digitizes three analog signals with its internal ADC: the first sensed voltage ($V_{sense1}$) 313, the second sensed voltage ($V_{sense2}$) 323, and a control signal 501. As the value of the first sense resistor ($R_{s1}$) 312 and the value of the second sense resistor ($R_{s2}$) 322 are known, the total input current is determined using the following equation:

$$I_{total} = \frac{V_{sense1}}{R_{s1}} + \frac{V_{sense2}}{R_{s2}}. \qquad \text{Equation (4)}$$

Figure 6:
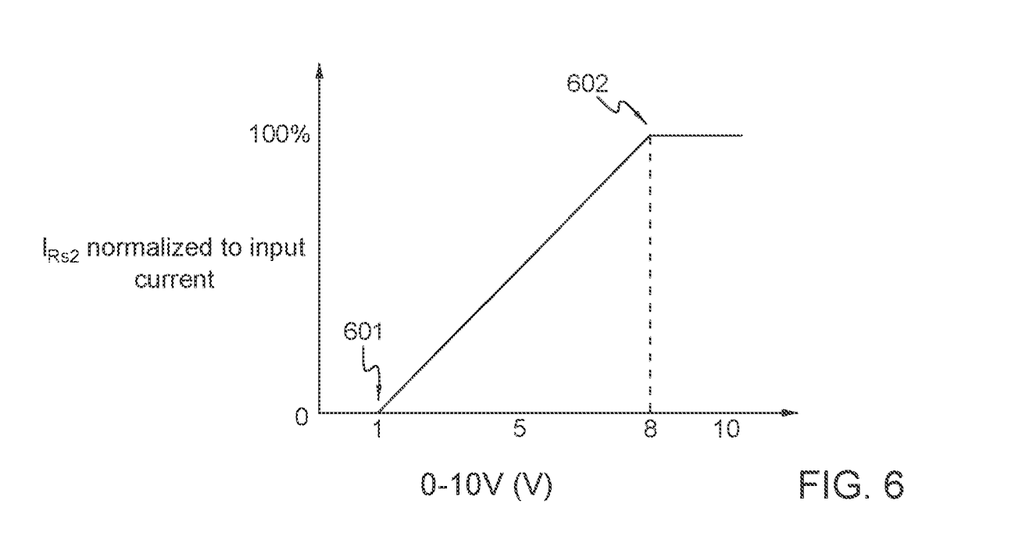
FIG. 6 is graph of a control signal that is fed into the microcontroller of FIG. 5.

Referring to FIG. 6, a ratio of the first sensed voltage ($V_{sense1}$) 313 to the second sensed voltage ($V_{sense2}$) 323 is modulated by a control signal 501 of the microcontroller. The microcontroller calculates the ratio of the first sensed voltage ($V_{sense1}$) 313 to the second sensed voltage ($V_{sense2}$) 323. The control signal 501 is mapped to the ratio of the first sensed voltage ($V_{sense1}$) 313 to the second sensed voltage ($V_{sense2}$) 323. When the control signal 501 is less than or equal to a first predetermined voltage 601, all of the input current is directed to the first current channel. When the control signal 501 is greater than or equal to a second predetermined voltage 602, all of the input current is directed to the second current channel. When the control signal 501 is between the first predetermined voltage 601 and the second predetermined voltage 602, the current may be scaled linearly between the first current channel and the second current channel. The current may also be scaled according to other curves and knee points. For example, between the first predetermined voltage 601 and the second predetermined threshold 602 the current may be staircased to provide stepped control.

In one embodiment, the control signal 501 has a range of 0-10V and the first predetermined voltage is 1V and the second predetermined voltage is 8V. Therefore, when the 0-10V control signal is less than or equal to 1V, all of the input current goes to the first current channel. When the 0-10V signal is greater than or equal to 8V, all of the input current goes to the second current channel. When the 0-10V signal is between 1V and 8V, the current is scaled linearly between the two channels.

The choice of the value of the first resistor ($R_{s1}$) 312 and the value of the second resistor ($R_{s2}$) 322 is a trade-off between resolution and power consumption. For the same current, the higher the value of the first resistor ($R_{s1}$) 312 and the value of the second resistor ($R_{s2}$) 322, the higher the first sensed voltage ($V_{sense1}$) 313 and the second sensed voltage ($V_{sense2}$) 323 are. A higher first sensed voltage ($V_{sense1}$) 313 and second sensed voltage ($V_{sense2}$) 323 allow the use of cheaper and less precise electrical circuits at the cost of increased power dissipation and reduced efficiency. If the value of the first resistor ($R_{s1}$) 312 is too large, it may be necessary to choose a larger MOSFET in order to have a lower internal resistance (Rds(on)). Additionally or alternatively, if the value of the first resistor ($R_{s1}$) 312 is too large, it may be necessary to have a higher supply voltage ($V_{dd}$), which makes it necessary to choose signal processing circuits capable of running at a higher voltage. This may potentially increase the cost of the circuit.

It should be noted that well-known structures shown in FIGS. 3 and 4, including one or more resistors, diodes, and capacitors, and processing steps have not been described in detail in order to avoid obscuring the embodiments described herein.

Figure 7:
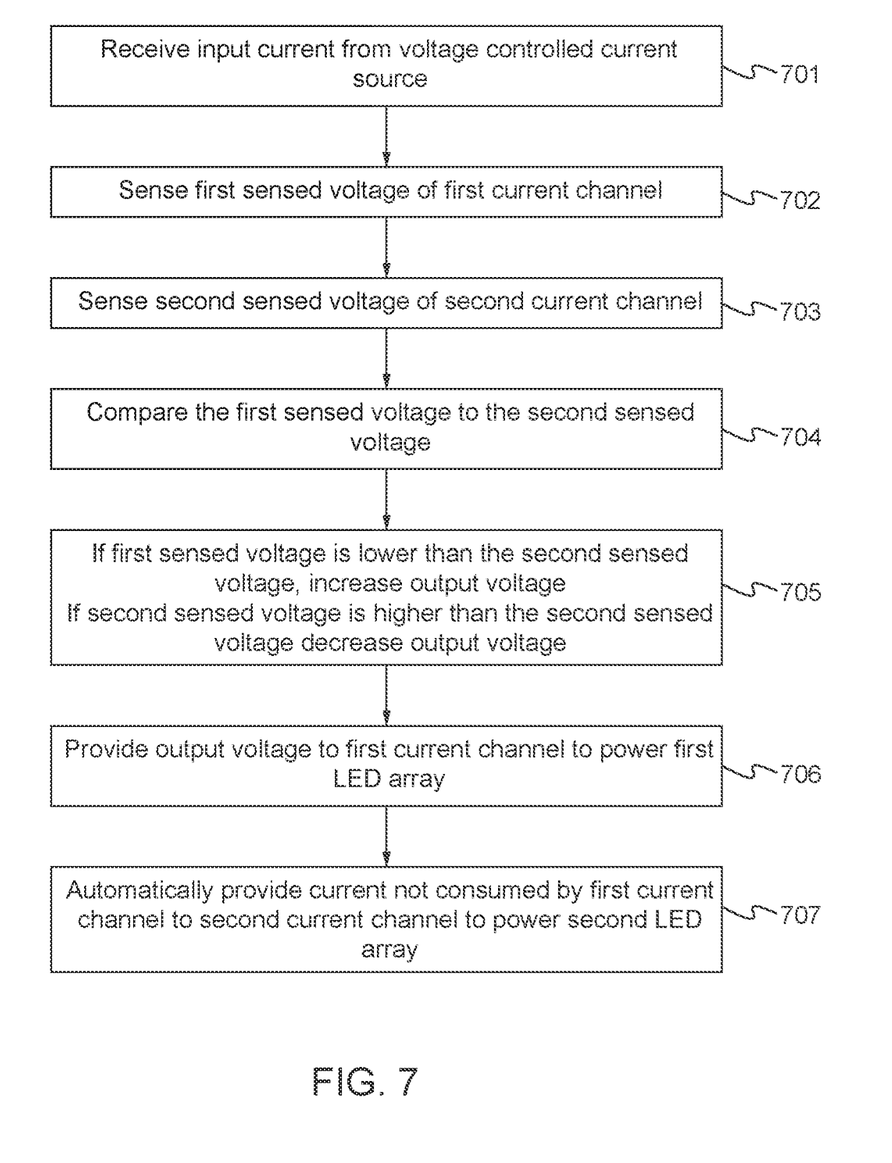
FIG. 7 is a flowchart illustrating a method for analog current division.

Referring now to FIG. 7, a flowchart illustrating a method for analog current division is shown. At step 701, an input current is received from a voltage controlled current source, such as an LED driver. At step 702, a first sensed voltage of a first current channel is sensed. At step 703, a second voltage of a second current channel is sensed. At step 704, the first sensed voltage and the second sensed voltage are compared to determine an output voltage. At step 705, if the first sensed voltage is lower than the second sensed voltage, the output voltage increases. If the first sensed voltage is higher than the second sensed voltage, output voltage decreases. At step 706, the output voltage is provided to the first current channel to power a first LED array. At step 707, the current that is left over after the first LED array has taken its share is automatically provided to the second current channel to power a second LED array.

The method shown in FIG. 7 may be performed by the current division circuit 300 utilizing the computational circuit 400 illustrated in FIG. 4. For example, at step 701, an input current may be received from the LED driver 301. At step 702, the first sense resistor ($R_{s1}$) 312 may sense a first sensed voltage ($V_{sense1}$) 313 of the first current channel 310. At step 702, the second sense resistor ($R_{s2}$) 322 may sense a second sensed voltage ($V_{sense2}$) of the second current channel 320. At step 704, the first sensed voltage ($V_{sense1}$) 313 and the second sensed voltage ($V_{sense2}$) 323 may be fed into the second op amp 430 of the computational circuit 400 which compares the first sensed voltage ($V_{sense1}$) 313 and the second sensed voltage ($V_{sense2}$) 323 by subtracting the first sensed voltage ($V_{sense1}$) 313 from the second sensed voltage ($V_{sense2}$) 323. At step 705, the computational circuit 400 may convert the difference of the first sensed voltage ($V_{sense1}$) 313 and the second sensed voltage ($V_{sense2}$) 323 into a charging current to charge the capacitor 440 to increase the set voltage ($V_{set}$) 350 when the first sensed voltage ($V_{sense1}$) 313 is less than the second sensed voltage ($V_{sense2}$) 323. In particular, when the first sensed voltage ($V_{sense1}$) 313 is less than the second sensed voltage ($V_{sense2}$) 323, the voltage supplied to the MOSFET shown in FIG. 4 activates the MOSFET (i.e., the MOSFET may be in an ON state), causing the source and drain of the MOSFET to be connected and leading to $V_{set}$ increasing until reaching a steady state ratio of the voltage divider output between the source resistor 450 and drain resistor or the MOSFET is deactivated (at which point, the capacitor 440 discharges essentially to ground through the source resistor 450). Further, the computational circuit 400 may convert the difference of the first sensed voltage ($V_{sense1}$) 313 and the second sensed voltage ($V_{sense2}$) 323 into a discharging current by, as above, deactivating the MOSFET and allowing the capacitor 440 to discharge through the resistor 450 to decrease the set voltage ($V_{set}$) 350 when the first sensed voltage ($V_{sense1}$) 313 is greater than the second sensed voltage ($V_{sense2}$) 323. The set voltage ($V_{set}$) 350 may then be supplied to the first current channel 310 to power the first LED array 311. The current that is left over after the first LED array 311 has taken its share is automatically provided to the second current channel 320 to power a second LED array 321.

Figure 8:
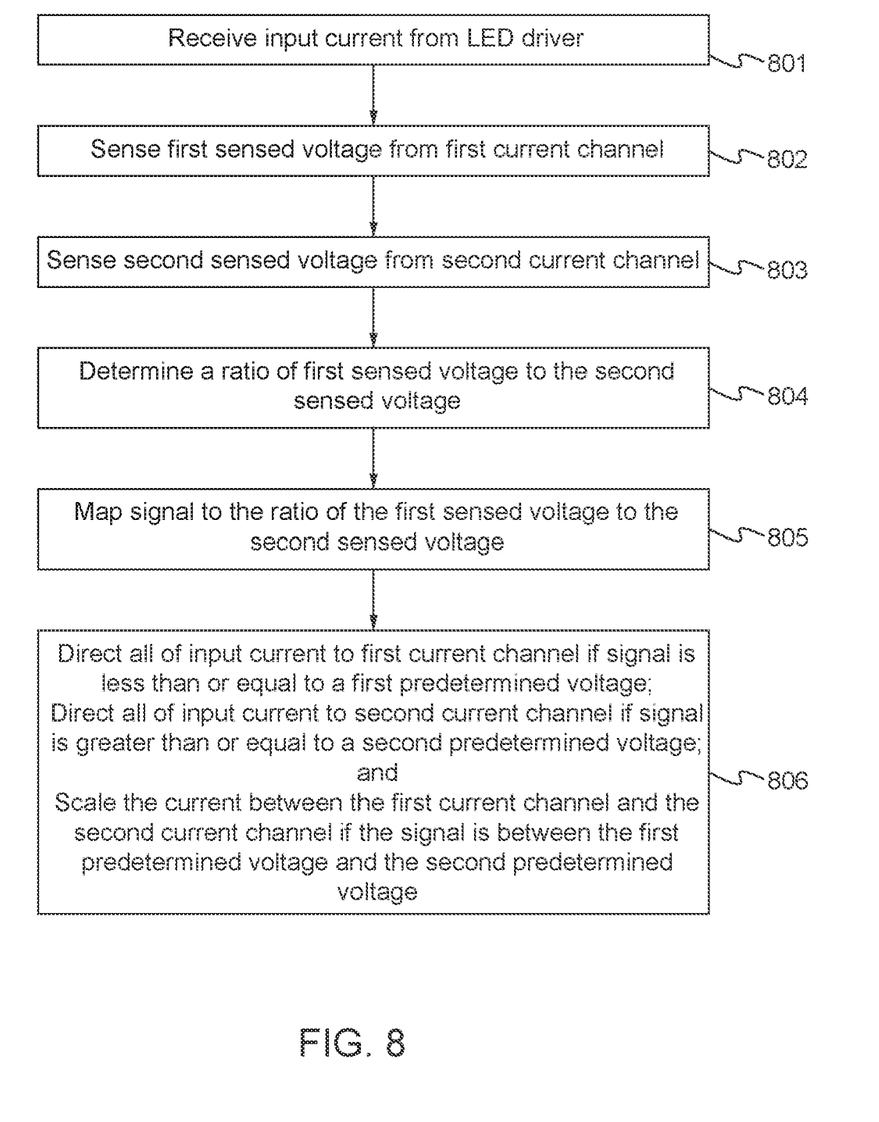
FIG. 8 is a flowchart illustrating another method for analog current division.

Referring now to FIG. 8, a flowchart illustrating a method for analog current division performed by a current division circuit comprising a microcontroller is shown. At step 801, an input current is received from a voltage controlled current source, such as an LED driver. At step 802, a first sensed voltage of a first current channel is sensed. At step 803, a second voltage of a second current channel is sensed. At step 804, a ratio of the first sensed voltage to the second sensed voltage is determined. At step 805, a control signal is mapped to the ratio of the first sensed voltage to the second sensed voltage. At step 806, when the signal is less than or equal to a first predetermined voltage, all of the input current is directed to the first current channel. If the signal is greater than or equal to a second predetermined voltage, all of the input current is directed to the second current channel. If the signal is between the first predetermined voltage and the second predetermined voltage, the current is scaled between the first current channel and the second current channel.

The method shown in FIG. 8 may be performed by the current division circuit 300 utilizing the microcontroller 500 illustrated in FIG. 5. For example, at step 801, an input current may be received from the LED driver 301. At step 802, the first sense resistor ($R_{s1}$) 312 may sense a first sensed voltage ($V_{sense1}$) 313 of the first current channel 310. At step 803, the second sense resistor ($R_{s2}$) 322 may sense a second sensed voltage ($V_{sense2}$) of the second current channel 320. At step 804, the first sensed voltage ($V_{sense1}$) 313, the second sensed voltage ($V_{sense2}$) 323, and the control signal 501 are fed into the microcontroller 500 which determines a ratio of the first sensed voltage to the first sensed voltage ($V_{sense1}$) 313 to the second sensed voltage ($V_{sense2}$) 323. At step 805, the microcontroller maps the ratio of the first sensed voltage ($V_{sense1}$) 313 to the second sensed voltage ($V_{sense2}$) 323. At step 806, the microcontroller directs all of input current to the first current channel 310 if signal is less than or equal to a first predetermined voltage 601, directs all of input current to second current channel 320 if the control signal 501 is greater than or equal to a second predetermined voltage 602, and scales the current between the first current channel 310 and the second current channel 320 if the control signal 501 is between the first predetermined voltage 601 and the second predetermined voltage 602.

The disclosed subject matter is therefore directed to control of luminous flux (e.g., "brightness level") of the LED arrays to control an overall intensity level of the ELDs or LED arrays couple to various embodiments of the disclosed subject matter. However, in other embodiments, both color temperature and a distance from the BBL 106 (CCT and $D_{uv}$) are controllable. In addition to using white LEDs of two or more CCTs, a combination of Red/Green/Blue/ Amber color LEDs may be used, or a combination of Red/Green/Blue color LEDs may be used. In the latter case, color tuning is seldom offered as an available function; the user is instead usually offered a color wheel based on either Red-Green-Blue (RGB) or Hue-Saturation-Lightness (HSL) models. However, the RGB and HSL models were not designed for general illumination/creation of white light and are more appropriate for graphics or photographic applications.

Figure 9A:
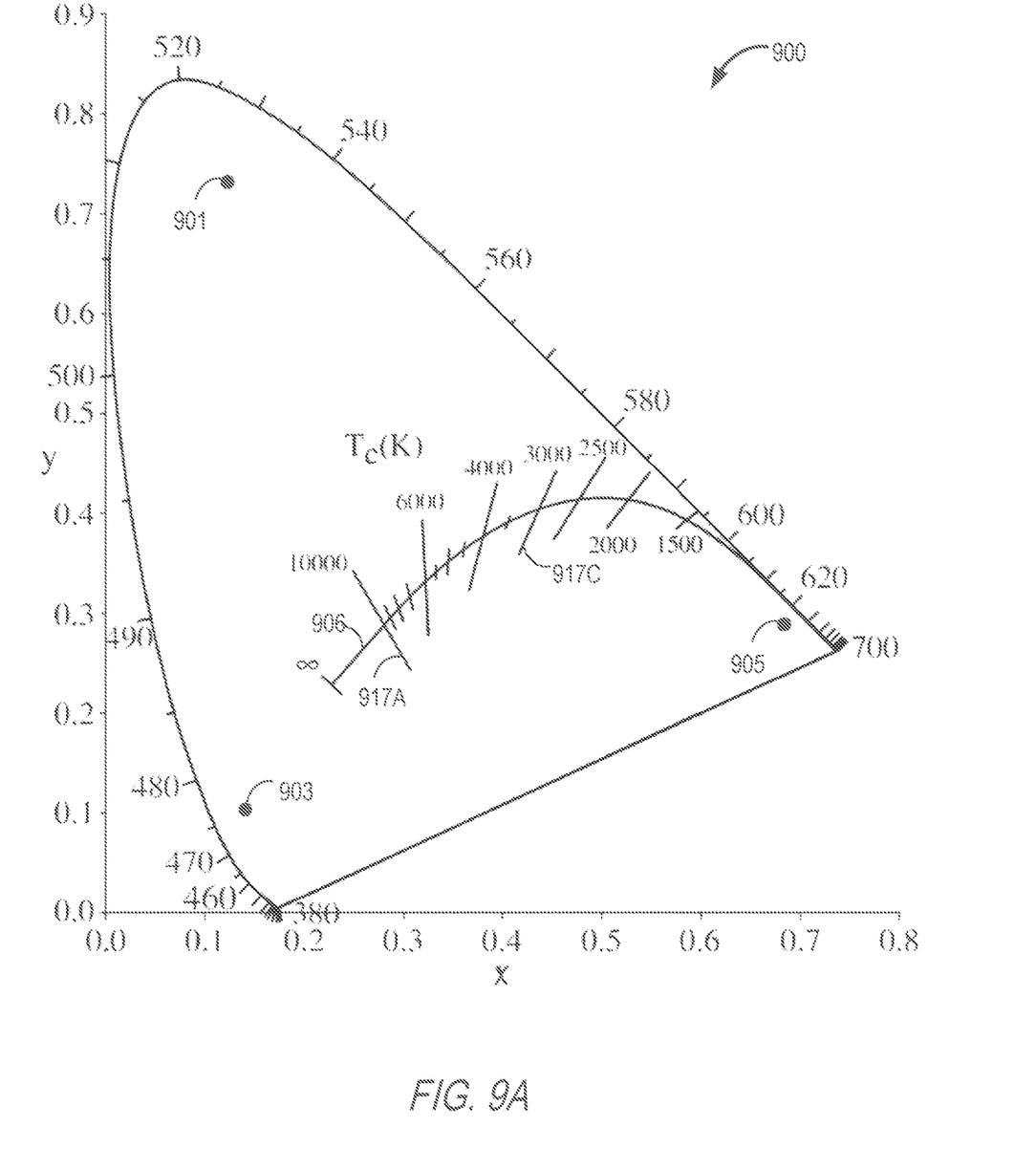
FIG. 9A is another chromaticity diagram representing a color space.
Figure 9B:
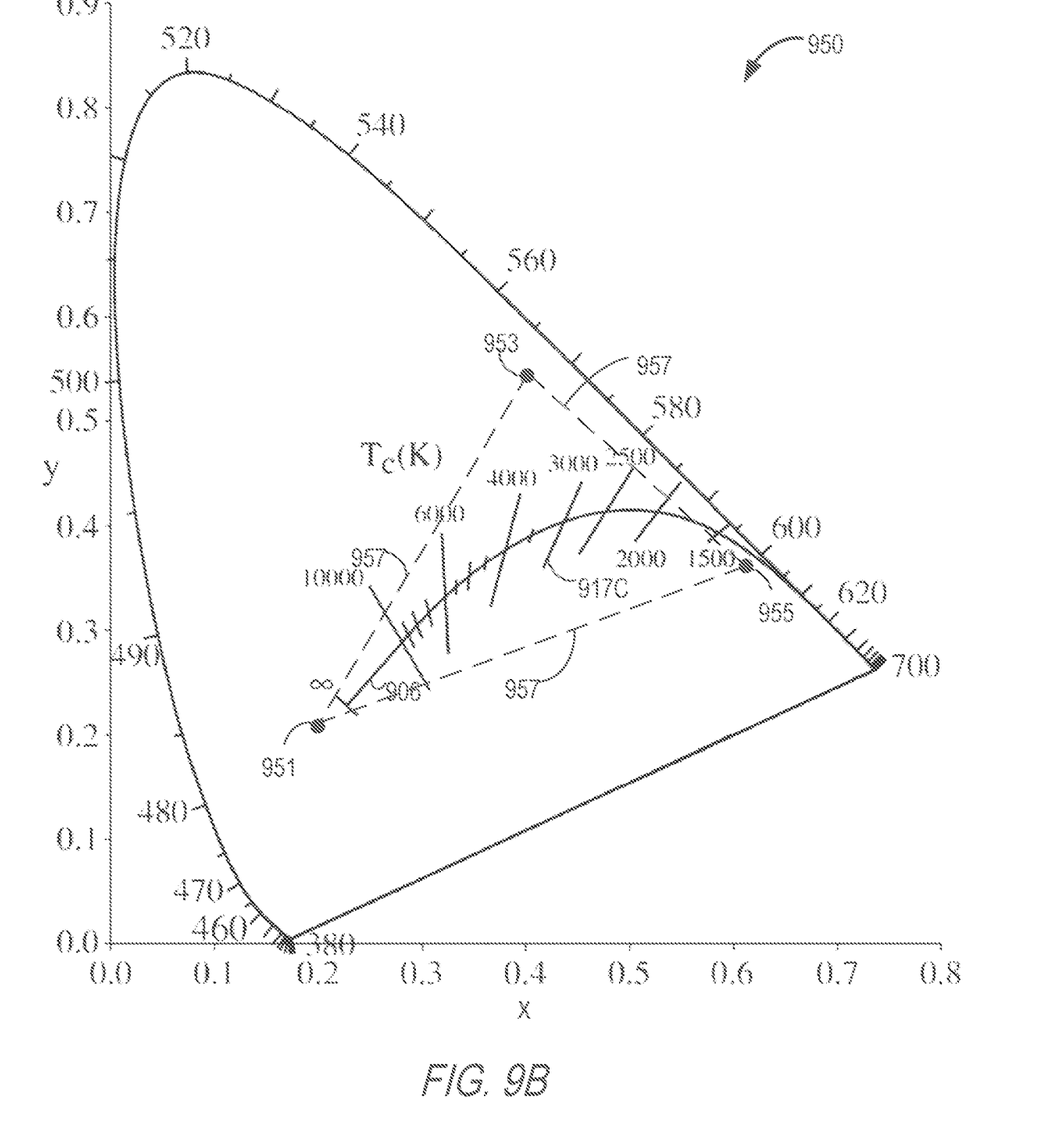
FIG. 9B is another chromaticity diagram representing a color space.
Figure 9C:
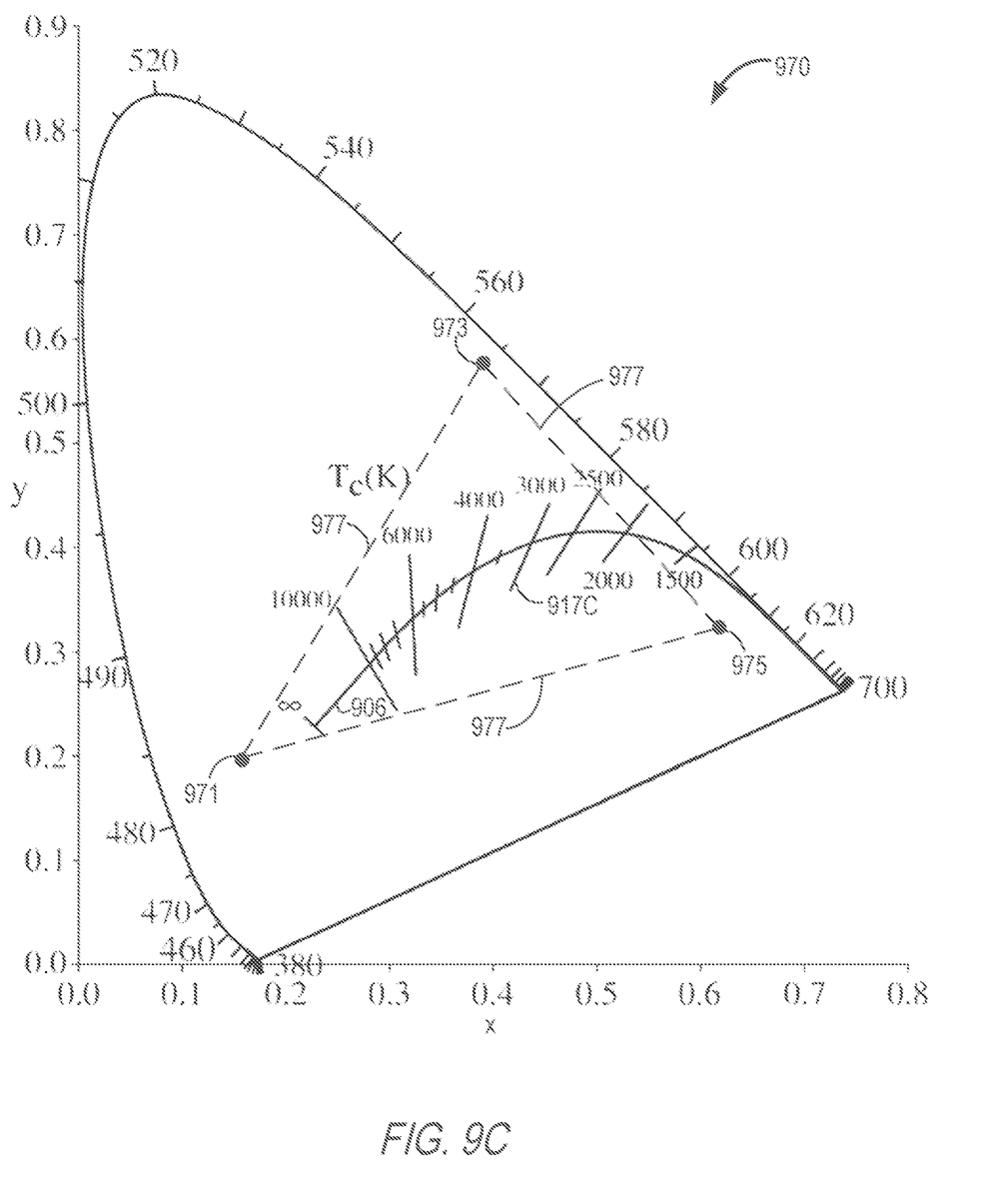
FIG. 9C is another chromaticity diagram representing a color space.

Color-tuning (covering one or both of CCT and $D_{uv}$) applications may be used for driving various colors of LEDs including, for example, primary color (Red-Green-Blue or RGB) LEDs, or desaturated (pastel) RGB color LEDs, to make light of various color temperatures with a high CRI and high efficiency, specifically addressing color mixing using phosphor-converted color LEDs. Desaturated LEDs have a luminescence in proximity to the BBL as shown in FIGS. 9A-9C, which show other chromaticity diagrams representing a color space. Note that, in color mixing to produce white light, the forward voltage of direct color LEDs decreases with increasing dominant wavelength. In some embodiments, in addition to the above embodiments, the LEDs can be driven with, for example, multichannel DC-to-DC converters. Advanced phosphor-converted color LEDs, targeting high efficacy and CRI, may be used. Such LEDs have desaturated color points and can be mixed to achieve white colors with 90+ CRI over a wide CCT range. Other LEDs having 80+ CRI implementations, or even 70+ CRI implementations (or even lower CRI values), may also be used.

As is known to a person of ordinary skill in the art, since light output of an LED is proportional to an amount of current used to drive the LED, dimming an LED can be achieved by, for example, reducing the forward current transferred to the LED. In addition to or instead of changing an amount of current used to drive each of a number of individual LEDs, a control unit or other type of multiplexer, switching apparatus, or similar apparatus known in the art, may rapidly switch selected ones of the LEDs in one or more of the arrays between "on" and "off" states to achieve an appropriate level of dimming and color temperature for the selected array.

Generally, LED drive circuits may be formed using either an analog-driver approach or a pulse-width modulation (PWM)-driver approach. In an analog driver approach, all colors are driven simultaneously. Each LED or LED array (hereinafter merely referred to as the LED) is driven independently by providing a different current for each LED. The analog driver results in a color shift. In a PWM driver, each color is switched on, in sequence, at high speed. Each color is driven with substantially the same current. The mixed color is controlled by changing the duty cycle of each color. That is, one color can be driven for twice as long as another color to add into the mixed color. As human vision is unable to perceive very fast changing colors, the light appears to have one single color. Note that this can also be used to produce white light if each set of RBG LEDs are activated in the same manner.

For example, a first LED (of a first color) is driven periodically with a current for a predetermined amount of time, then a second LED (of a second color) is driven periodically with the same current for a predetermined amount of time, and then a third LED (of a third color) is driven periodically with the current for a predetermined amount of time. Each of the three predetermined amounts of time may be the same amount of time or different amounts of time. The mixed color is therefore controlled by changing the duty cycle of each color. For example, if you have an RGB LED and desire a specific output, red may be driven for a portion of the cycle, green for a different portion of the cycle, and blue is driven for yet another portion of the cycle based on the perception of the human eye. Instead of driving the red LED at a lower current, it is driven at substantially the same current for a shorter time.

Note that the desaturated RGB approach can create tunable light on and off the BBL, as well as on the BBL, for example, an isothermal CCT line (as described below) while maintaining a high CRI. Various other systems, in comparison, utilize a CCT approach where tunable color-points fall on a straight line between two primary colors of LEDs (e.g., R-G, R-B, or G-B). Referring back to FIG. 2, any color point on an isothermal line to the BBL 106 has a constant CCT.

As above, with reference to FIG. 1, various ellipses of the CIE color chart represent a MAE 102 centered on the BBL 106 and extend one or more steps in distance from the BBL 106. As the MAE 102 contains all colors which are indistinguishable, to a typical observer, from a color at the center of the ellipse, each of the MAE steps are seen to a typical observer as being substantially the same color as a color at the center of a respective one of the MAEs. The isothermal lines to the BBL 106 thus represent substantially equal distances from the BBL 106 and are related to $D_{uv}$ values (e.g., of +0.006, +0.003, 0, −0.003 and −0.006).

The chromaticity diagram 900 shown in FIG. 9A has approximate chromaticity coordinates of colors for typical coordinate values (as noted on the x-y scale of the chromaticity diagram) for a red (R) LED at x=about 0.69 and y=about 0.29 (coordinate 901), a green (G) LED at x=about 0.12 and y=about 0.73 (coordinate 903), and a blue (B) LED at x=about 0.13 and y=about 0.1 (coordinate 905). While FIG. 1 shows an example of the chromaticity diagram for defining the wavelength spectrum of a visible light source, other suitable definitions are known in the art and can also be used with the various embodiments of the disclosed subject matter described herein.

A convenient way to specify a portion of the chromaticity diagram is through a collection of equations in the x-y plane, where each equation has a locus of solutions that defines a line on the chromaticity diagram. The lines may intersect to specify a particular area. As an alternative definition, a white light source can emit light that corresponds to light from a blackbody source operating at a given color temperature.

The chromaticity diagram also shows the BBL 906 as described above with reference to FIG. 2. Each of the three R, G, and B LED coordinate locations above are the CCT coordinates for "fully-saturated" LEDs of the respective colors green, blue, and red. However, if a "white light" is created by combining certain proportions of the R, G, and B LEDs, the CRI of such a combination would be extremely low. Typically, in the environments described above, such as retail or hospitality settings, a CRI of about 90 or higher is desirable.

A revised version of the chromaticity diagram 950, 970 as shown in FIGS. 9B and 9C may be used with approximate chromaticity coordinates for desaturated R, G, and B LEDs in proximity to the BBL 906 (indicated by isothermal lines 917a, 917c), the desaturated R, G, and B LEDs having a CRI of approximately 90+ and within a defined color temperature range. However, the coordinate values may be shifted to a desaturated red (R) LED at x=about 0.61 and y=about 0.36 (coordinate 955), a desaturated green (G) LED at x=about 0.4 and y=about 0.54 (coordinate 953), and a desaturated blue (B) LED at x=about 0.21 and y=about 0.21 (coordinate 951) or other set of desirable values as will be understandable to a person of ordinary skill in the art upon reading and understanding the disclosed subject matter. In various embodiments, a color temperature range of the desaturated R, G, and B LEDs may be in a range from about 1800 K to about 2500 K, about 2700 K to about 6500 K, or about 1800 K to about 7500 K, for example.

In a specific exemplary embodiment, a triangle 957 formed between each of the coordinate values for the desaturated R, G, and B LEDs is also shown. The desaturated R, G, and B LEDs are formed (e.g., by a mixture of phosphors and/or a mixture of materials to form the LEDs as is known in the art) to have coordinate values in proximity to the BBL 906. Consequently, the coordinate locations of the respective desaturated R, G, and B LEDs, and as outlined by the triangle 957, has a CRI of approximately 90 or greater and an approximate tunable color-temperature-range of, for example, about 2700 K to about 6500 K. Therefore, the selection of a correlated color temperature (CCT) may be selected in the color-tuning application described herein such that all combinations of CCT selected all result in the lamp having a CRI of 90 or greater. Each of the desaturated R, G, and B LEDs may comprise a single LED or an array (or group) of LEDs, with each LED within the array or group having a desaturated color the same as or similar to the other LEDs within the array or group. A combination of the one or more desaturated R, G, and B LEDs comprises a lamp.

Another revised version of the chromaticity diagram 970 shown in FIG. 9C may have the triangle 977 formed by different coordinates for the desaturated R, G, and B LEDs in proximity to the BBL 906, the desaturated R, G, and B LEDs having a CRI of approximately 80+ and within a defined color temperature range that is broader than the desaturated R, G, and B LEDs above. In this case, the approximate chromaticity coordinates for desaturated R, G, and B LEDs are arranged farther from the BBL 106 than the desaturated R, G, and B LEDs indicated above. Coordinate values (as noted on the x-y scale of the chromaticity diagram) may be shifted to a desaturated red (R) LED at x=about 0.61 and y=about 0.32 (coordinate 975), a desaturated green (G) LED at x=about 0.39 and y=about 0.58 (coordinate 973), and a desaturated blue (B) LED at x=about 0.19 and y=about 0.2 (coordinate 971).

As above, a color temperature range of the desaturated R, G, and B LEDs shown in FIG. 9C may be in a range from about 1800 K to about 2500 K, about 2700 K to about 6500 K, or about 1800 K to about 7500 K. This leads to coordinate locations of the respective desaturated R, G, and B LEDs, having a CRI of approximately 80 or greater and an approximate tunable color-temperature-range of, for example, about 1800 K to about 7500 K. Since the color temperature range is greater than the range above, the CRI is commensurately decreased to about 80 or greater. However, a person of ordinary skill in the art will recognize that the desaturated R, G, and B LEDs may be produced to have individual color temperatures anywhere within the chromaticity diagram. Therefore, the selection of a CCT may be selected in the color-tuning application described herein such that all combinations of CCT selected all result in the lamp having a CRI of 80 or greater. Each of the desaturated R, G, and B LEDs may comprise a single LED or an array (or group) of LEDs, with each LED within the array or group having a desaturated color the same as or similar to the other LEDs within the array or group. A combination of the one or more desaturated R, G, and B LEDs comprises a lamp.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Having described the invention in detail, those skilled in the art will appreciate that, given the present disclosure, modifications may be made to the invention without departing from the disclosed subject matter described herein. Therefore, it is not intended that the scope of the invention be limited to the specific embodiments illustrated and described.

What is claimed is:

1. A device comprising:
   a first current channel including:
      a first sense resistor configured to provide a first sensed voltage, and
      a first voltage control switch configured to control a first light emitting diode (LED) array;
   a second current channel including:
      a second sense resistor configured to provide a second sensed voltage, and
      a second voltage control switch to which a switching voltage is to be provided by a shunt regulator, the second voltage control switch configured to control a second LED array;
   a voltage controlled current source configured to drive the first current channel and the second current channel dependent on the first sensed voltage and the second sensed voltage; and
   a voltage divider to which an output of the voltage controlled current source is to be supplied, an output of the voltage divider to be supplied to the shunt regulator.

2. The device of claim 1, wherein:
   the shunt regulator has an internal reference voltage, and
   the output of the voltage divider is to be supplied to the reference node such that the switching voltage provided by the shunt regulator is configured to turn the second voltage control switch OFF in response to the output of the voltage divider being larger than the internal reference voltage and the switching voltage provided by the shunt regulator is configured to turn the second voltage control switch ON in response to the output of the voltage divider being smaller than the internal reference voltage.

3. The device of claim 1, wherein the voltage controlled current source comprises an operational amplifier configured to compare the first sensed voltage to a set voltage that is based on the first sensed voltage and the second sensed voltage.

4. The device of claim 3, wherein the operational amplifier has an inverting input to which the first sensed voltage is to be supplied through a resistor and a non-inverting input to which the set voltage is supplied.

5. The device of claim 1, wherein an output of the voltage controlled current source is to be supplied directly to the first voltage control switch.

6. The device of claim 1, further comprising a plurality of regulated current channels that is one fewer than a total number of current channels, the regulated current channels comprising the first current channel, the second current channel being an unregulated current channel.

7. The device of claim 1, wherein the first LED array is configured to have a correlated color temperature (CCT) at a first tunable range and the second LED array is configured to have a CCT at a second tunable range.

8. A device comprising:
   a first current channel including:
      a first sense resistor configured to provide a first sensed voltage, and
      a first voltage control switch configured to control a first light emitting diode (LED) array;
   a second current channel including:
      a second sense resistor configured to provide a second sensed voltage, and
      a second voltage control switch configured to control a second LED array;
   a voltage controlled current source configured to drive the first current channel and the second current channel based on a set voltage; and
   a computational circuit configured to increase the set voltage when the first sensed voltage is more than the second sensed voltage and decrease the set voltage when the first sensed voltage is less than the second sensed voltage.

9. The device of claim 8, wherein the computational circuit comprises:
   an operational amplifier including an inverting input to which the first sensed voltage is to be provided and a non-inverting input to which the second sensed voltage is to be provided, an output of the operational amplifier to be provided as feedback to the inverting input through a capacitor;
   a computational circuit switch having an input to which the output of the operational amplifier is to be provided; and
   an RC circuit connected to the computational circuit switch and configured to provide the set voltage.

10. The device of claim 8, wherein the computational circuit is configured to provide the set voltage based on a ratio of the first sensed voltage to the second sensed voltage.

11. The device of claim 10, wherein the computational circuit comprises a microcontroller configured to adjust the set voltage based on a mapping of a control signal to the ratio.

12. The device of claim 11, wherein the microcontroller is configured to adjust the set voltage non-linearly over at least a portion of the mapping.

13. The device of claim 12, wherein the microcontroller is configured to adjust the set voltage such that current supplied between the first current channel and the second current channel is to drive only the first LED array when the ratio is at most equal to a first value and is to drive only the second LED array when the ratio is at least a second value that is larger than the first value.

14. The device of claim 13, wherein the microcontroller is further configured to adjust the set voltage such that the current is to be scaled linearly between the first current channel and the second current channel when the ratio is between the first value and the second value.

15. The device of claim 12, wherein the microcontroller is configured to adjust the set voltage such that current is to be supplied between the first current channel and the second current channel in a staircased manner between the first and second current channels when the control signal is in an intermediate range of the mapping.

16. A method of driving light emitting diode (LED) arrays, the method comprising:
sensing a first sensed voltage of a first current channel comprising a first LED array;
sensing a second sensed voltage of a second current channel comprising a second LED array;
comparing the first sensed voltage to the second sensed voltage to determine a set voltage based on one of:
a difference between the first sensed voltage and the second sensed voltage, or
a ratio of the first sensed voltage and the second sensed voltage and a control signal; and
driving the first current channel and the second current channel based on the set voltage to:
when set voltage is determined based on the difference between the first sensed voltage and the second sensed voltage, increase the set voltage when the first sensed voltage is greater than the second sensed voltage and decrease the set voltage when the first sensed voltage is less than the second sensed voltage, and when set voltage is determined based on the ratio of the first sensed voltage and the second sensed voltage, adjust the set voltage based on a mapping of the control signal to the ratio.

17. The method of claim 16, further comprising, when set voltage is determined based on the ratio of the first sensed voltage and the second sensed voltage:
adjusting the set voltage such that current supplied between the first current channel and the second current channel drives only the first LED array when the ratio is at most equal to a first value and drives only the second LED array when the ratio is at least a second value that is larger than the first value.

18. The method of claim 17, further comprising, when set voltage is determined based on the ratio of the first sensed voltage and the second sensed voltage:
adjusting the set voltage such that the current is scaled linearly between the first current channel and the second current channel when the ratio is between the first value and the second value.

* * * * *